Jan. 16, 1923.
1,442,262.
C. F. FOLSOM.
BRAKE MECHANISM FOR VEHICLES.
FILED JAN. 31, 1921.
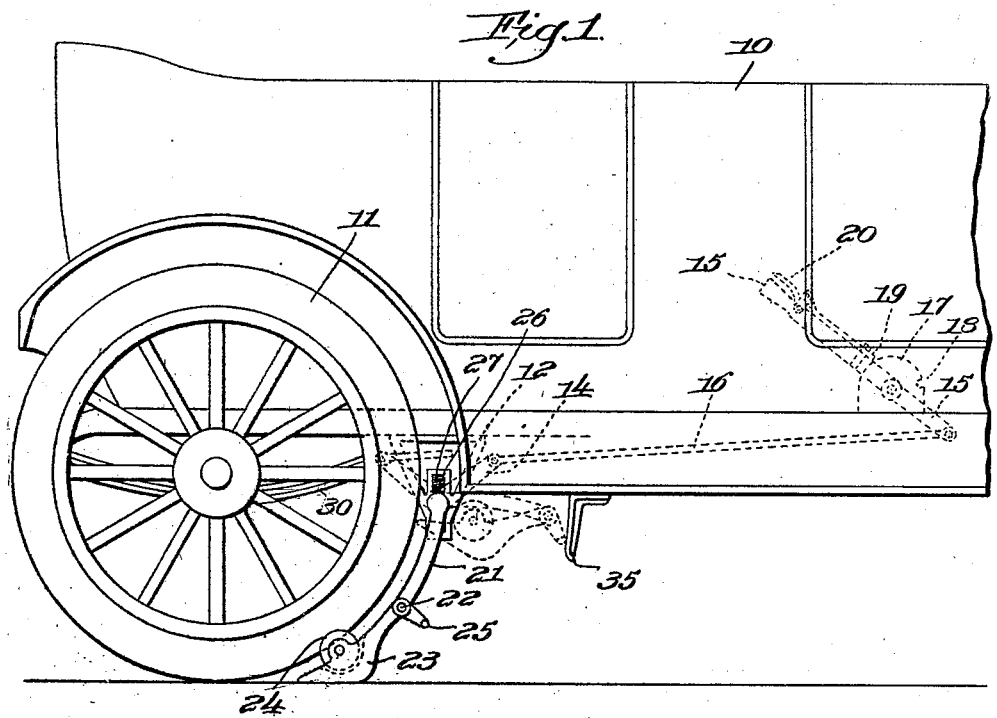
Inventor,
Charles F. Folsom,
by Edward H. Allen.
his Atty.

Patented Jan. 16, 1923.

1,442,262

UNITED STATES PATENT OFFICE.

CHARLES F. FOLSOM, OF MALDEN, MASSACHUSETTS.

BRAKE MECHANISM FOR VEHICLES.

Application filed January 31, 1921. Serial No. 441,143.

*To all whom it may concern:*

Be it known that I, CHARLES F. FOLSOM, a citizen of the United States of America, and a resident of Malden, in the county of Middlesex and Commonwealth of Massachusetts, have invented certain new and useful Improvements in Brake Mechanism for Vehicles, of which the following is a specification.

This invention relates to emergency brakes for use in connection with vehicles and more particularly with motor driven vehicles.

An object of the invention is to produce a brake that is normally held in folded inoperative position in a compact and not unsightly manner, and yet so arranged as to be instantly brought into position for operation with but slight effort, and by a perfectly natural action on the part of the operator.

A further object is to produce a brake that contacts with the ground and acts in conjunction with the wheels of a vehicle, preferably the rear wheels, which transfer their rolling movement to the shoes of the brake in such manner that the said shoes will tend to wedge between the said wheels and the ground, the wheels however not riding up on the shoes but rather exert a downward pressure on them through a roll or similar device interposed therebetween which will effectually brake the vehicle.

A further object of the invention is to construct a brake of the character above mentioned, which, after braking the vehicle, may be restored to its normal position with but slight effort on the part of the operator, and without the necessity of first moving the vehicle backward to free the shoes from the wheels.

Various patents have been issued wherein ground contacting shoes have been used, but in such manner that after the braking of the vehicle, the shoes could not be restored to inoperative position until the vehicle had been rolled rearwardly sufficiently for the wheels to disengage from them. It is an object of this invention to overcome this objectionable feature and therefore it is not the intention to limit this invention to the precise construction shown, as it is obvious that various changes might be made in the construction and arrangement thereof without departing from the spirit and scope of this invention.

To the attainment of the above objects the invention consists in certain novel features of construction and arrangement of parts which will be fully understood by reference to the description of the drawings and the claims hereinafter given.

Of the drawings:

Figure 1 represents in side elevation a sufficient portion of a vehicle with the invention applied thereto to enable the operation thereof to be understood.

Figure 2 is top plan view of the brake mechanism, certain portions of the vehicle being shown in dotted lines.

Figure 3 is a detail to be referred to.

Referring to the drawings:

The vehicle 10 mounted on the wheels 11 has conveniently secured thereto brackets 12 adapted to support a rock shaft 13, on which a lever 14 is secured which in turn is pivotally connected to the hand lever 15 at the lower end thereof by means of the link 16. The said hand lever 15 being pivotally mounted on a segment shaped bracket 17 in which is a notch 18 adapted to receive the bolt 19 of a lock member 20.

The hand lever 15 it will be understood is located conveniently for the operator and it will also be understood that a pedal or foot lever attachment may be used in place thereof, and therefore it is not the intention to limit this invention to a manually operated brake mechanism.

Fast with the shaft 13 are the depending bifurcated arms 21 at the lower ends of which are pivoted at 22 the shoes 23 having revolubly mounted therein the spool-like rolls 24. Finger-like projections 25 fast with the shoes 23 are provided for a purpose to be hereinafter explained.

The full line position of the parts shown in the drawings indicate the operative position thereof to brake the vehicle, while the dotted line position shows the normal or inoperative position thereof with the parts neatly folded up, in this instance under the running board or step of the vehicle, and to great extent obscured from view.

For the proper operation of the brake it has been found advisable to mount the shoe carrying devices in such manner that relative movement of the shoes 23 and vehicle body 10 may take place and one means for so doing is herein shown. The brackets 12 which support the shaft 13 are provided with openings 26 through which the said shaft passes, suitable slidable bearings 27 being provided therefor which will be guided in said openings. Springs 28 and 29 in said openings are arranged to normally hold the said shaft 13 in central position in said openings, but will yield upwardly or downwardly as required to compensate for movements of the body 10 on the springs 30.

As it is desirable for the sake of appearance to conceal the brake device when not in use, the pivot 22, previously referred to, is provided, and adjacent thereto the fingers 25 fast with the shoes 23 are so arranged as to contact with the depending brackets 35 upon the upward movement of the arms 21.

When it is desired to restore the brake device to normal position, the hand lever 15 will be moved forwardly until the bolt 19 enters the notch 18 in bracket 17, thereby rocking the shaft 13 and breaking the toggle-like arrangement of the levers 21 and shoes 23 at the pivots 22. This movement requires but slight effort on the part of the operator and effectually disengages the shoes from their wedge-like contact with the ground and wheels. The aforesaid rocking of the shaft 13 causes the arms 21 to assume the dotted line position Figure 1, and in so doing the fingers 25 will be brought in contact with the brackets 35 swinging the shoes into the dotted line position shown in said figure at which position the parts will be securely locked until again released by the locking members 19 and 20.

It is an essential feature of the invention that a wedge-like action shall be performed by the shoes 23 and it is equally essential that the wheels 11 shall not ride up on the shoes 23, and to overcome the latter the spool-like rolls 24 are revolubly mounted in said shoes and are so located as to receive a downward pressure from the revolving wheels, and since they revolve by reason of contact with the wheels it will be readily understood that the said wheels will not leave the ground nor will they be retarded in rotation relatively to the forward movement of the body 10.

In other words, the shoes 23 do not wedge the wheels so that rotation thereof is stopped, but the rolling movement thereof will be transformed to a downward pressure to the shoes through the rolls 24 causing the said shoes to closely contact with the ground, thereby causing a rapid yet harmless stoppage to the vehicle.

It is obvious that the invention is equally useful in stopping a vehicle when skidding, and to give greater lateral resistance to the arms 21 the rolls 24 are concaved to embrace the tires of the vehicle to thereby receive and overcome the lateral strain that would be imposed upon the said arms, at the most effectual point.

Having described the invention I claim:

1. In a device of the class described, a vehicle body; wheels thereon; a rock shaft; shoe carrying arms secured to said rock shaft non-rotatable shoes; shoes pivotally connected to said arms and adapted to be positioned in advance of said wheels; rolls carried by said shoes adapted to contact with said wheels and transform the rotary movement thereof to a depressing movement to said shoes; and means to position said shoes.

2. In a device of the class described, a vehicle body; wheels thereon; brackets attached to said body; a rock shaft yieldingly mounted in said brackets; brake mechanism including non-rotatable shoes movable with said shaft adapted to be positioned in advance of said wheels; and means to position said brake mechanism.

3. In a device of the class described, a vehicle body; wheels thereon; a rock shaft; bearings in which said rock shaft is yieldingly mounted; an arm fast to said rock shaft; a shoe pivoted to said arm, said arm and shoe being adapted to be positioned for use in advance of the said wheels but normally held in retracted position; a finger like projection fast with said shoe adapted to engage a projection extending from the body of the vehicle whereby the said shoe will be caused to fold upon the said arm during the retracting movement thereof; and means to hold said arm and shoe in said retracted position.

Signed by me at Boston, Mass., this 28th day of January, 1921.

CHARLES F. FOLSOM.